(12) United States Patent
Talon et al.

(10) Patent No.: US 9,936,836 B2
(45) Date of Patent: Apr. 10, 2018

(54) BEVERAGE PREPARATION MACHINE

(71) Applicant: NESTEC S.A., Vevey (CH)

(72) Inventors: Christian Talon, Vufflens-le-Chateau (CH); Nihan Dogan, La Croix-sur-Lutry (CH); Alfred Yoakim, St-legier-la Chiesaz (CH)

(73) Assignee: Nestec S.A., Vevey (CH)

( * ) Notice: Subject to any disclaimer, the term of this patent is extended or adjusted under 35 U.S.C. 154(b) by 951 days.

(21) Appl. No.: 14/370,675

(22) PCT Filed: Dec. 18, 2012

(86) PCT No.: PCT/EP2012/075967
§ 371 (c)(1),
(2) Date: Jul. 3, 2014

(87) PCT Pub. No.: WO2013/102557
PCT Pub. Date: Jul. 11, 2013

(65) Prior Publication Data
US 2014/0373722 A1    Dec. 25, 2014

(30) Foreign Application Priority Data
Jan. 5, 2012    (EP) .................................... 12150225

(51) Int. Cl.
*A47J 31/36* (2006.01)
*A47J 31/58* (2006.01)
*A47J 31/06* (2006.01)

(52) U.S. Cl.
CPC ........... *A47J 31/58* (2013.01); *A47J 31/0657* (2013.01); *A47J 31/0668* (2013.01);
(Continued)

(58) Field of Classification Search
CPC ........ A47J 31/0657; A47J 31/24; A47J 31/34; A47J 31/30; A47J 31/32; A47J 31/3623; A47J 31/3676; A47J 31/58
(Continued)

(56) References Cited

U.S. PATENT DOCUMENTS 4,738,378 A * 4/1988 Oakley ................... A47J 31/10
                                                       222/165
5,642,656 A    7/1997 Braendle
(Continued)

FOREIGN PATENT DOCUMENTS

FR         2842091           1/2004

OTHER PUBLICATIONS

International Search Report for International Application No. PCT/EP2012/075967 dated May 27, 2013.
(Continued)

*Primary Examiner* — Reginald L Alexander
(74) *Attorney, Agent, or Firm* — K&L Gates LLP

(57) ABSTRACT

The present invention concerns a beverage preparation machine (1) comprising: a reservoir (2) for a fluid, a brewing head (3) adapted to receive at least one ingredient capsule (100) comprising at least one beverage preparation ingredient (104), a pump (6) for pumping a predetermined volume of said fluid from said reservoir (2) to said brewing head (3), such that said fluid can be injected into said capsule (100), when said capsule (100) is received by said brewing head (3), to mix with said ingredient (104) under pressure and produce a predetermined volume of beverage, wherein the reservoir (2), the pump (6), and an inserted ingredient capsule (100) in use are in fluidic communication and form a fluid system (800), and wherein the beverage preparation machine (1) further comprises a pressure sensor (301; 302; 303; 304) adapted to measure internal pressure (P) within an
(Continued)

ingredient capsule (100) inserted inside said brewing head (3), and a locking mechanism (401) adapted to prevent disconnection of the inserted ingredient capsule (100) from the fluid system (800) if the measured internal pressure (P) exceeds a predetermined threshold pressure value (Pt).

20 Claims, 5 Drawing Sheets

(52) U.S. Cl.
CPC ......... *A47J 31/369* (2013.01); *A47J 31/3623* (2013.01); *A47J 31/3676* (2013.01); *A47J 31/3695* (2013.01)

(58) Field of Classification Search
USPC .............................................. 99/295, 302 R
See application file for complete search history.

(56) References Cited

U.S. PATENT DOCUMENTS

| | | | | |
|---|---|---|---|---|
| 6,763,759 B2* | 7/2004 | Denisart | ................. | A47J 31/36 99/295 |
| 2014/0331868 A1* | 11/2014 | Novak | ................... | B65D 85/73 99/323.2 |

OTHER PUBLICATIONS

International Written Opinion for International Application No. PCT/EP2012/075967 dated May 27, 2013.

* cited by examiner

BEVERAGE PREPARATION MACHINE

CROSS REFERENCE TO RELATED APPLICATIONS

The present application is a National Stage of International Application No. PCT/EP2012/075967, filed on Dec. 18, 2012, which claims priority to European Patent Application No. 12150225.6, filed Jan. 5, 2012, the entire contents of which are being incorporated herein by reference.

FIELD OF THE INVENTION

The present invention concerns a beverage preparation machine, particularly a beverage preparation machine for use with a capsule comprising a beverage preparation ingredient, said capsule being designed to be inserted into said machine for preparation of a beverage by mixing, under pressure, a fluid and said ingredient in the capsule.

BACKGROUND OF THE INVENTION

Beverage preparation machines are well known in the food science and consumer goods area. Such machines allow a consumer to prepare at home a given type of beverage, for instance a coffee-based beverage, e.g. an espresso or a brew-like coffee cup.

Today, most beverage preparation machines for in-home beverage preparation comprise a system made of a machine which can accommodate portioned ingredients for the preparation of the beverage. Such portions can be soft pods or pads, or sachets, but more and more systems use semi-rigid or rigid portions such as rigid pods or capsules. In the following, it will be considered that the beverage machine of the invention is a beverage preparation machine working with a rigid or semi-rigid capsule.

The machine comprises a receptacle for accommodating said capsule and a fluid injection system for injecting a fluid, preferably water, under pressure into said capsule. Water injected under pressure in the capsule, for the preparation of a coffee beverage according to the present invention, is preferably hot, that is to say at a temperature above 70° C. However, in some particular instances, it might also be at ambient temperature. The pressure inside the capsule chamber during extraction and/or dissolution of the capsule contents is typically about 1 to about 8 bar for dissolution products and about 2 to about 12 bar for extraction of roast and ground coffee. Such a preparation process differs a lot from the so-called "brewing" process of beverage preparation—particularly for tea and coffee, in that brewing involves a long time of infusion of the ingredient by a fluid (e.g. hot water), whereas the beverage preparation process allows a consumer to prepare a beverage, for instance coffee, within a few seconds.

The principle of extracting and/or dissolving the contents of a closed capsule under pressure is known and consists typically of confining the capsule in a receptacle of a machine, injecting a quantity of pressurized water into the capsule, generally after piercing a face of the capsule with a piercing injection element such as a fluid injection needle mounted on the machine, so as to create a pressurized environment inside the capsule either to extract the substance or dissolve it, and then release the extracted substance or the dissolved substance through the capsule. Capsules allowing the application of this principle have already been described for example in applicant's European patent no. EP 1 472 156 B1, and in EP 1 784 344 B1.

Machines allowing the application of this principle have already been described for example in patents CH 605 293 and EP 242 556. According to these documents, the machine comprises a receptacle for the capsule and a perforation and injection element made in the form of a hollow needle comprising in its distal region one or more liquid injection orifices. The needle has a dual function in that it opens the top portion of the capsule on the one hand, and that it forms the water inlet channel into the capsule on the other hand.

The machine further comprises a fluid tank—in most cases this fluid is water—for storing the fluid that is used to dissolve and/or infuse and/or extract under pressure the ingredient(s) contained in the capsule. The machine comprises a heating element such as a boiler or a heat exchanger, which is able to warm up the water used therein to working temperatures (classically temperatures up to 80-90° C.). Finally, the machine comprises a pump element for circulating the water from the tank to the capsule, optionally though the heating element. The way the water circulates within the machine is e.g. selected via a selecting valve means, such as for instance a peristaltic valve of the type described in applicant's European patent application EP 2162653 A1.

When the beverage to be prepared is coffee, one interesting way to prepare the coffee is to provide the consumer with a capsule containing roast and ground coffee powder, which is to be extracted with hot water injected therein.

Capsules have been developed for such an application, which are described and claimed in applicant's European patent EP 1 784 344 B1, or in European patent application EP 2 062 831.

In short, such capsules comprise typically:
a hollow body and an injection wall which is impermeable to liquids and to air and which is attached to the body and adapted to be punctured by e.g. an injection needle of the machine,
a chamber containing a bed of roast and ground coffee to be extracted,
an aluminum membrane disposed at the bottom end of the capsule, closing the capsule, for retaining the internal pressure in the chamber, the membrane being associated with piercing means for piercing dispensing holes in the aluminum membrane when the internal pressure inside the chamber reaches a certain pre-determined value,
optionally, means configured to break the jet of fluid so as to reduce the speed of the jet of fluid injected into the capsule and distribute the fluid across the bed of substance at a reduced speed. It is often important for the consumer to know when the water level in the machine tank is too low to prepare a full beverage.

Capsules 100 of the prior art, as illustrated in FIG. 1, feature an injection wall or membrane 101 (referred to as top membrane) which is to be pierced by a fluid injection needle 102 of a beverage preparation machine (not shown; see e.g. 1 in FIG. 3) being part of a fluid system, e.g. as explained in connection with FIG. 8. When liquid is injected in a capsule compartment 103, a pressure is built up, which serves as an extraction means for extracting ingredients 104 contained inside the capsule, as described above.

In prior art capsules, when the needle 102 is removed from the capsule 100, after the beverage has been prepared and dispensed, the capsule top membrane 101 is now pierced and a hole 105 remains as illustrated in FIG. 2. However, in such a case, the internal or extraction fluid pressure "P" remains at least partly in the capsule compartment 103.

In case the capsule 100 contains soluble ingredient to extract, the capsule compartment 103 generally comprises one single portion, and the residual fluid pressure is distributed across the compartment volume.

In case the capsule compartment is divided into several portions, e.g. as illustrated in FIGS. 1 and 2, the residual pressure "P" is located in the top portion 106 of the capsule compartment 103, which accommodates the fluid injection needle 102 when inserted as illustrated in FIG. 1. In this case, the ingredient to be extracted 104, typically roast and ground coffee "RG", is contained in a central portion 107 of the capsule where the top portion 106 is disposed above the central portion 107. In addition, another portion 108 is disposed below the central portion 107 and comprises another membrane 109 (referred to as bottom membrane) closing the capsule through which the extracted or dissolved substance is released as indicated by an arrow in FIG. 2.

In certain cases, due to the residual internal pressure P that remains inside the capsule compartment after the capsule has been used, liquid splashes—often referred to as "whale effect" or backflow of product—can spray out of the capsule top membrane 101, through the hole 105 pierced by the needle 102, at the time the consumer opens the brewing head of the machine. Such a backflow occurs when the consumer opens the brewing head of the machine too early, that is to say, before sufficient liquid inside the capsule has time to flow out and therefore before the residual pressure inside the capsule has been given enough time to decrease. In some exceptional cases, the backflow is very important due to a very high residual internal pressure within the capsule so that a jet of liquid splashes out of the capsule, which is named "whale effect". Such a "whale effect" is represented in FIG. 2. Although such a phenomenon occurs randomly and infrequently, it is undesirable because hot liquid splashing out is messy. Moreover, in case the liquid is water mixed with an ingredient, such a leakage of liquid from the capsule top membrane is also undesirable for a cleanliness point of view, which forces the consumer to spend time cleaning the machine and its surroundings after usage.

It is therefore an objective of the present invention to provide a beverage preparation system and machine that prevents or at least reduces the so-called "whale effect" described above.

SUMMARY OF THE INVENTION

The objective mentioned above is fulfilled with a beverage preparation machine comprising:
(i) a reservoir for a fluid,
(ii) a brewing head adapted to receive at least one ingredient capsule comprising at least one beverage preparation ingredient,
(iii) a pump for pumping a predetermined volume of said fluid from said reservoir to said brewing head, such that said fluid can be injected into said capsule, when said capsule is received by said brewing head, to mix with said ingredient under pressure and produce a predetermined volume of beverage, wherein the reservoir, the pump, and an inserted ingredient capsule in use are in fluidic communication and form a fluid system,
characterized in that the beverage preparation machine further comprises:
a pressure sensor adapted to measure internal pressure (P) within an ingredient capsule inserted inside said brewing head, and
a locking mechanism adapted to prevent disconnection consumer of the inserted ingredient capsule from the fluid system if the measured internal pressure (P) exceeds a predetermined threshold pressure value ($P_t$).

In this way, control is provided to avoid or reduce the "whale effect" in an effective and simple way since the capsule cannot be disconnected or released until the internal pressure "P" is below a threshold avoiding or reducing the "whale effect".

Throughout the present specification, measuring internal pressure "P" is to be understood as both direct and in-direct, e.g. estimated, measurement of the internal pressure inside a capsule.

In one embodiment, the locking mechanism is adapted to prevent access for a consumer to the received ingredient capsule or to lock the inserted ingredient capsule in place when the measured internal pressure value (P) exceeds the predetermined threshold pressure value (Pt).

In one embodiment, the pressure sensor is located in the brewing head.

In one embodiment, the pressure sensor is located within the fluid system.

In one embodiment, the pressure sensor is located in or in connection to a fluid connection between an inlet of a fluid injection needle and the pump.

In one embodiment, the pressure sensor is located near or adjacent to the inlet of the fluid injection needle.

In one embodiment, the brewing head comprises a capsule holder to receive a capsule where the pressure sensor is embedded in a wall of the capsule holder that is adjacent to a wall of a capsule, when the capsule is inserted in the capsule holder, and wherein the pressure sensor is adapted to measure pressure being exerted on at least a part of the wall of the capsule holder caused by internal pressure of a capsule, when received in the capsule holder.

In one embodiment, the pressure sensor comprises a spring or resilient member connected to a fluid injection needle, such that the fluid injection needle is movable along its longitudinal axis, where the spring or resilient member is adapted to be compressed in correspondence with movement of the fluid injection needle where the fluid injection needle is moved in dependence of the internal pressure within the capsule.

In one embodiment, the brewing head comprises a surface connected to a fluid injection needle where the surface is adjacent and connects with a top membrane of a capsule, when the capsule is inserted in the machine and wherein the pressure sensor is embedded in or connected to the surface and measures pressure exerted upon at least a part of the surface, In one embodiment, the internal pressure (P) is measured using measurement of a flow of a fluid in the fluid system.

In one embodiment, the beverage preparation machine comprises a weight sensor located under a container for receiving the beverage being prepared and wherein the flow of fluid is measured on the basis of measured change of weight of the container over time.

In one embodiment, the internal pressure (P) is measured using measurement of a flow of a fluid in the fluid system and a predetermined flow-resistance of the inserted capsule.

In one embodiment, the predetermined threshold pressure value (Pt) is a relative pressure of about 0.05 bar to about 0.5 bar.

In one embodiment, the beverage preparation machine further comprises a capsule holder operable by a consumer to receive an ingredient capsule and wherein the locking mechanism is adapted to lock the capsule holder when the measured internal pressure (P) exceeds a predetermined threshold pressure value (Pt).

In one embodiment, the beverage preparation machine comprises a surface connected to a fluid injection needle where the surface is adjacent and connects with a top membrane of a capsule and wherein the locking mechanism is adapted to prevent movement of the surface when the measured internal pressure (P) exceeds a predetermined threshold pressure value (Pt).

BRIEF DESCRIPTION OF THE DRAWINGS

Additional features and advantages of the present invention are described in, and will be apparent from, the description of the presently preferred embodiments which are set out below with reference to the drawings in which.

DETAILED DESCRIPTION OF THE INVENTION

Figure 1:
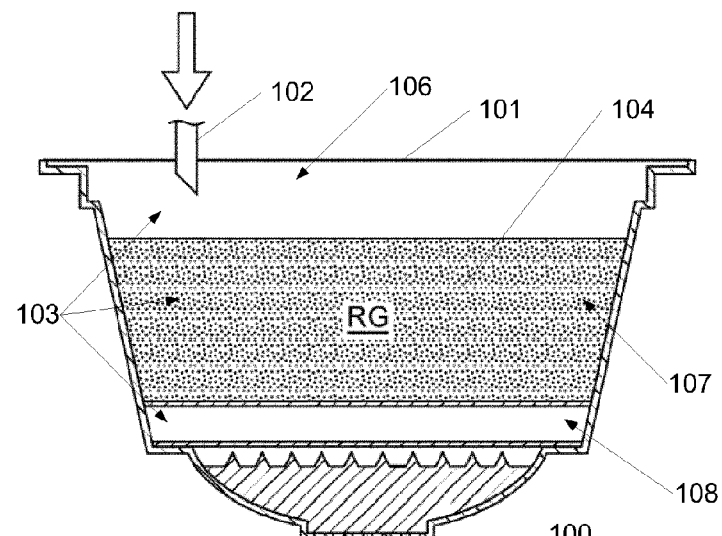
FIG. 1 is a schematic profile cut view of a capsule according to the prior art at the beginning of liquid injection therein.
Figure 2:
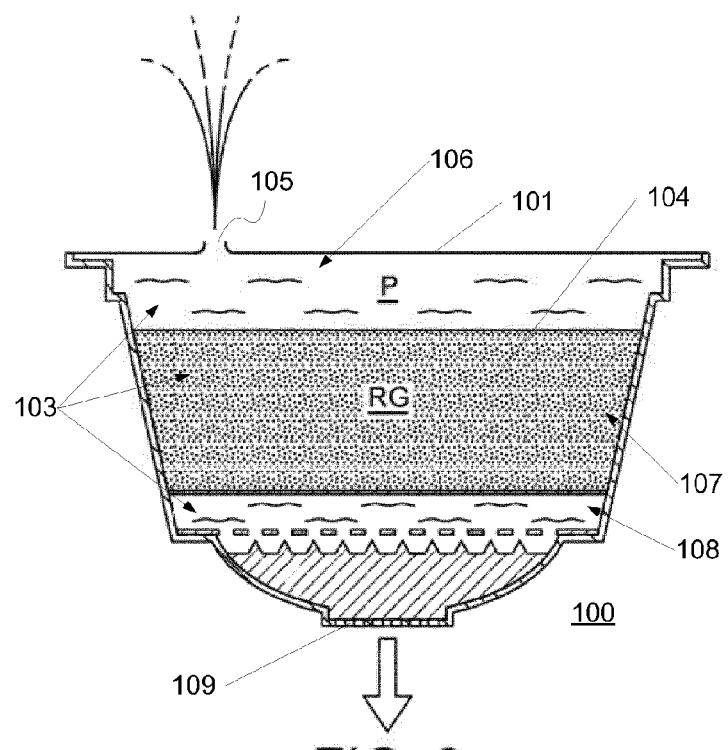
FIG. 2 is a view similar to FIG. 1, showing the backflow of liquid under pressure after the injection needle has been removed from the top membrane.
Figure 3:
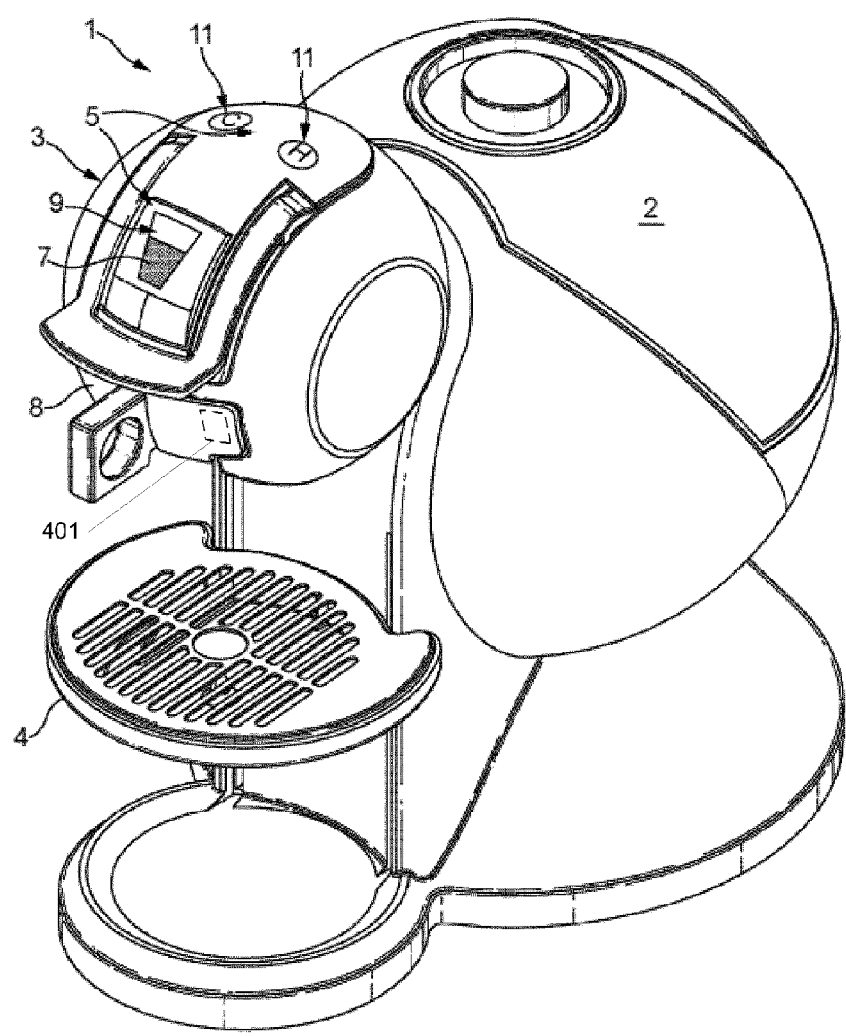
FIG. 3 is a schematic view of a beverage preparation machine.

FIG. 3 is a schematic view of a beverage preparation machine. Shown is a beverage preparation machine 1 comprising a reservoir 2 for a fluid (preferably water), a brewing head 3 adapted to receive at least one ingredient capsule (not shown; see e.g. 100 in FIGS. 1 and 2) comprising at least one beverage preparation ingredient (not shown; see e.g. 104 in FIGS. 1 and 2), and a pump (not shown; see e.g. 6 in FIG. 8), like a pressure pump or corresponding unit, for pumping a predetermined volume of the fluid from the reservoir 2 to the brewing head 3, such that the fluid can be injected into the capsule to mix with the ingredient under pressure, and thereby produce a predetermined volume of beverage which then is dispensed e.g. in a cup or other container (not shown) e.g. placed onto a tray or the like 4.

The reservoir 2, the pump, and an inserted ingredient capsule in use are in fluidic communication and they form a fluid system (not shown; see e.g. 800 in FIG. 8), The beverage preparation machine 1 may further comprise a heating element (not shown; see e.g. 11 in FIG. 8) for optionally and selectively heating the fluid pumped from the reservoir 2 before it enters the capsule and an electronic control system (not shown) able to receive input from a consumer operated control panel or the like 5 and to actuate operation of the various components of the beverage preparation machine 1 like pump, heating element, control panel, and/or brewing head 3, etc. The control panel or the like 5 may e.g. comprise one or more consumer selection elements, like physical and/or on-screen buttons 11, and/or a display 9 for showing text and/or graphical information 7 to a consumer.

The beverage preparation machine 1 may further comprise a capsule holder 8, which is used to load one or more capsules into the beverage preparation machine and place the loaded capsule(s) into the brewing head 3 for use by the beverage preparation machine 1. Alternatively, the beverage preparation machine 1 does not comprise a capsule holder but instead a capsule or similar may be directly placed inside the brewing head 3 where no part of the machine is displaced for inserting or removing the capsule into or from the machine.

The beverage preparation machine also comprises a pressure sensor (not shown; see e.g. 301, 302, 303, and 304 in FIGS. 4-7) adapted to measure internal pressure "P" within a capsule 100 inserted inside the brewing head 3 and a locking mechanism 401 adapted to prevent disconnection of the inserted ingredient capsule from the fluid system if the measured internal pressure (P) exceeds a predetermined threshold pressure value (Pt). In this way, control is provided to avoid or reduce the "whale effect" in an effective and simple way since the capsule cannot be disconnected or released until the internal pressure "P" is below a threshold avoiding or reducing the "whale effect".

One way of preventing that the inserted ingredient capsule is disconnected from the fluid system is by controlling access for a consumer to the inserted ingredient capsule.

In one embodiment, the locking mechanism 401, will lock the capsule holder 8 so that it cannot be opened or accessed by a consumer when the measure internal pressure "P" is larger than the predetermined threshold pressure value (Pt), which is selected so that the risk of the "whale effect" happening is avoided or at least reduced.

In some embodiments, the predetermined threshold pressure value (Pt) is a relative pressure about 0.05 bar to about 0.5 bar, i.e. the ambient or atmospheric is added to arrive at absolute pressure values. The predetermined threshold pressure value (Pt) may also be another pressure value depending on implementation choices.

Locking of the capsule may e.g. happen when beverage preparation is started in the beverage preparation machine or when the ingredient capsule is properly inserted into the beverage preparation machine.

The locking mechanism 401 may e.g. be of the type that comprise electric, magnetic, or mechanical locking elements, and/or the like adapted to lock and unlock the capsule holder (8) if the machines is equipped with one. The locking mechanism may e.g. simply block movement of a lever or handle (e.g. 201 in FIGS. 4-7) on the brewing head that normally actuates movement of a needle part or plate (e.g. 111 in FIGS. 4-7) but may be of any suitable type.

As another alternative, e.g. for machines where no part of the machine is displaced for inserting or removing the capsule into or from the machine, is to lock the inserted capsule itself, e.g. using electric, magnetic, and/or mechanical locking elements, e.g. by locking the needle part or plate (111 in FIGS. 4-7) or similar. What is significant is that the locking mechanism 401 selectively can prevent disconnection of an inserted ingredient capsule from the fluid system.

Different embodiments of the sensor will be discussed in further details in connection with FIGS. 4-8.

Figure 4:
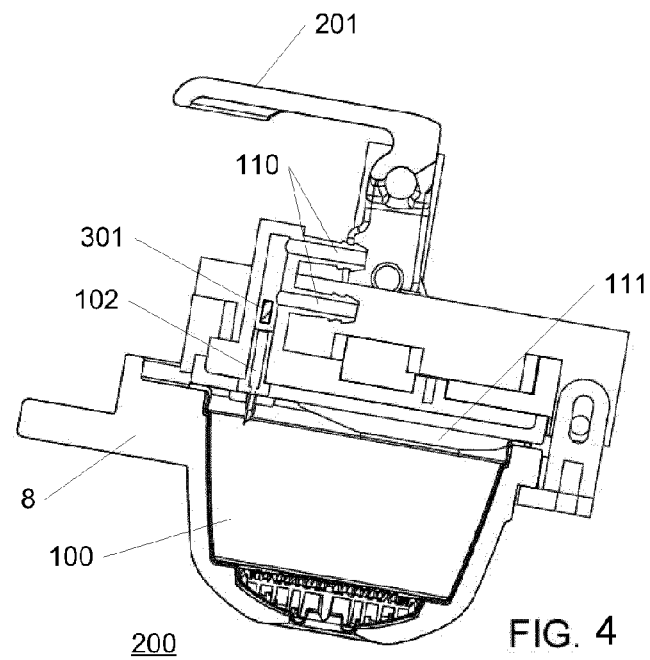
FIG. 4 is a schematic cross-section of a brewing unit according to one aspect.

FIG. 4 is a schematic cross-section of a brewing unit according to one aspect. Shown is a brewing unit 200 of a brewing head of a beverage preparation machine comprising an ingredient capsule 100 inserted in a capsule holder 8. Shown are also a fluid injection needle 102 as explained earlier and a fluid connection part, in this example, with two fluid connectors 110 for connecting the fluid injection needle 102 with a pump (not shown), e.g. via tubing or the like, as part of a fluid system, e.g. like the one shown in connection with FIG. 8. The needle 102, in this exemplary embodiment, is connected to a surface or needle plate 111 pressing against the top membrane of the capsule when inserted. The brewing unit 200 also comprises a lever or handle on the brewing head that actuates movement of the needle plate enabling insertion/removal and locking of the capsule, respectively.

Further shown is a pressure sensor 301 that in this particular embodiment is located in a segment of the fluid system between the inlet of the fluid injection needle 102 and the two fluid connectors 110. In at least some embodiments, it is preferred that the pressure sensor 301 is located near or adjacent to the inlet of the fluid injection needle 102 for improved accuracy but in may in principle be located anywhere in the fluid system. The pressure sensor 301 measures the pressure at its location and measures the internal pressure "P" of the capsule. The pressure here is virtually equal to the pressure inside the ingredient capsule 100 once the pump is stopped. A measured internal pressure value "P" may be communicated to a control unit, e.g. for further processing, in turn signalling the locking mechanism (not shown; see e.g. 401 in FIG. 3).

As mentioned, the pressure sensor 301 may be located in the tubing between the inlet of the fluid injection needle 102 and the two fluid connectors 110 or alternatively, in an additional piping segment diverting some of the fluid in these connections.

It should be noted, that the sensor 301 may also be placed at other positions in the fluid system, e.g. elsewhere in connection with either of the two fluid connectors 110 or as explained in greater detail in connection with FIG. 8.

The pressure sensor 301 may e.g. be a membrane sensor, e.g. located at a segment diverting some of the fluid, where the extent of displacement of the membrane is measured, which is a function of the pressure, or it may be a pressure sensor, e.g. a piezoelectric sensor, located at the side of tubing measuring the extent of deformation of the tubing, which is a function of the pressure.

Figure 5:
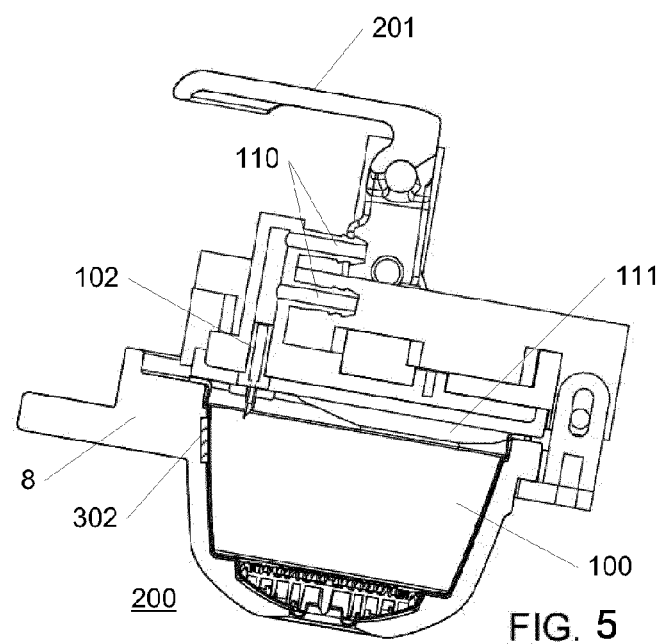
FIG. 5 is a schematic cross-section of the a brewing unit according to an alternative aspect.

FIG. 5 is a schematic cross-section of the brewing unit according to an alternative aspect. Shown is a brewing unit 200 of the brewing head of the beverage preparation machine comprising an ingredient capsule 100 inserted in a capsule holder 8 corresponding to the one shown in FIG. 4 except as noted in the following.

Shown in FIG. 5 is a pressure sensor 302 that is differently placed than the sensor shown in FIG. 4. The sensor 302 is embedded in a wall of the capsule holder 8 and measures an applied pressure to a predetermined area. The wall of a typical ingredient capsule (100) is thin and deformable and thus takes shape of the capsule holder 8 when inserted therein. Therefore pressure applied to the inside of a wall of the ingredient capsule 100, due to the internal pressure "P" within the ingredient capsule, is detectable outside of that wall. A given measured pressure relates to a given internal pressure and the sensor 302 is thereby able to measure the internal pressure within the received ingredient capsule. A measured internal pressure value may be communicated to a control unit, e.g. for further processing, in turn signalling the locking mechanism (not shown; see e.g. 401 in FIG. 3). The pressure sensor may e.g. be a capacitive sensor, a piezoelectric sensor, a membrane sensor, or any other suitable type.

It is to be understood that the location of the sensor 302 may be different to the one shown in the figure.

Figure 6:
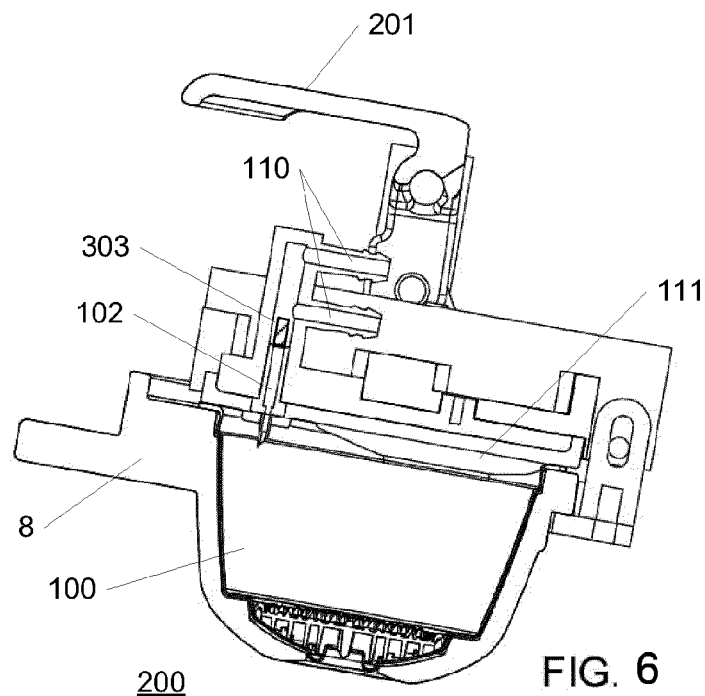
FIG. 6 is a schematic cross-section of the a brewing unit according to a further alternative aspect.

FIG. 6 is a schematic cross-section of the brewing unit according to a further alternative aspect. Shown is a brewing unit 200 of the brewing head of the beverage preparation machine comprising an ingredient capsule 100 inserted in a capsule holder 8 corresponding to the one shown in FIG. 4 except as noted in the following.

Shown in FIG. 6 is a pressure sensor 303 that is differently placed than the sensor shown in FIG. 4. The sensor 303 is located near the fluid injection needle 102 and the needle is mounted on an axis associated with a spring or other resilient member mechanism, such that the needle is movable along its longitudinal axis and is pushed away from the capsule in dependence of the pressure inside the capsule. The sensor 303 measures the amount of displacement of the fluid injection needle, which is a function of the internal pressure "P" within the ingredient capsule. A measured internal pressure value may be communicated to a control unit, e.g. for further processing, in turn signalling the locking mechanism (not shown; see e.g. 401 in FIG. 3).

Figure 7:
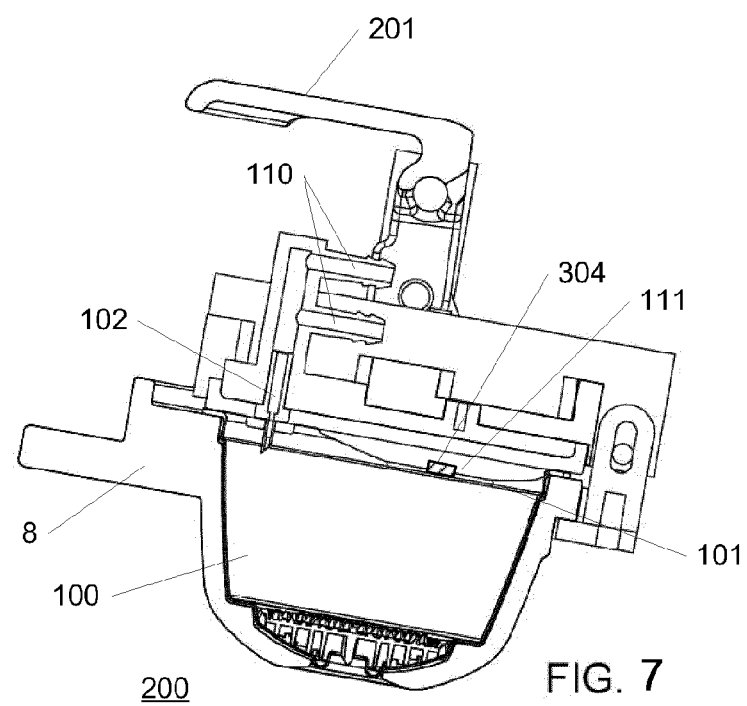
FIG. 7 is a schematic cross-section of the brewing unit according to yet another alternative aspect.

FIG. 7 is a schematic cross-section of the brewing unit according to a further alternative aspect. Shown is a brewing unit 200 of the brewing head of the beverage preparation machine comprising an ingredient capsule 100 inserted in a capsule holder 8 corresponding to the one shown in FIG. 4 except as noted in the following.

Shown in FIG. 7 is a pressure sensor 304 that is embedded in a needle plate 111 or the like that presses against the top membrane 101 of the capsule when inserted. The top membrane 101 will be displaced as a function of the internal pressure "P" of the capsule. A given measured pressure relates to a given internal pressure and the sensor 304 is thereby able to measure the internal pressure within the received ingredient capsule.

A measured internal pressure value may be communicated to a control unit, e.g. for further processing, in turn signalling the locking mechanism (not shown; see e.g. 401 in FIG. 3).

The pressure sensor may e.g. be a piezoelectric sensor, or any other suitable type.

It is to be understood that the location of the sensor 304 may be different to the one shown in the figure.

Figure 8:
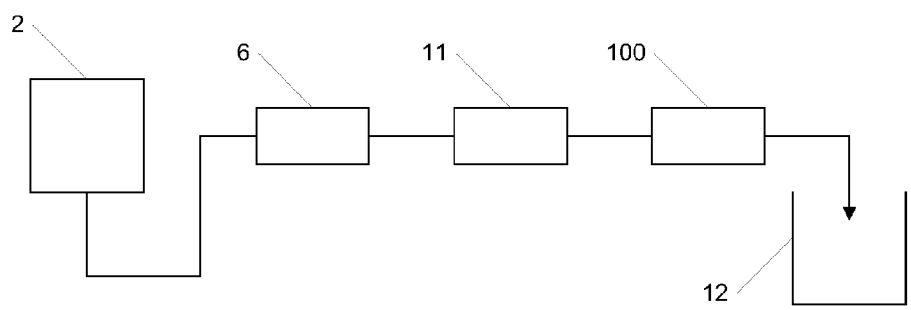
FIG. 8 is a schematic representation of a fluid system in a beverage preparation machine.

FIG. 8 is a schematic representation of a fluid system in a beverage preparation machine. Shown is a fluid system 800 comprising, in this exemplary embodiment, a reservoir 2 for a fluid, a pump 6, a heating element 11, and a capsule 100 where the reservoir 2 is in fluidic connection with the pump 6 being in connection with the heating element 11 finally being in connection with the capsule. Further shown is a container 12 like a cup or similar for receiving the beverage after preparation. A pressure sensor may be comprised at various locations in the fluid system as described earlier, e.g. at or near the capsule inside the brewing head, or upstream from the brewing head (outside the brewing head and between the capsule and the heating element or between the heating element and the pump or between the pump and the reservoir). A pressure sensor may also, as described earlier, be located outside the fluid system at or near the capsule.

As a further embodiment, the internal pressure "P" may be measured using a measurement of the flow rate of the fluid. The internal pressure "P" is proportional to the flow rate multiplied by the flow-resistance of the capsule or the flow-resistance of the fluid at other places. The flow-resistance of various capsules can readily be determined and e.g. stored in the beverage preparation machine. The flow rate may either be measured using a flow rate sensor or it may be derived e.g. using a weight sensor or scale e.g. located in a tray or similar for supporting the container 12 during beverage preparation so the sensor or scale is located under the container thereby weighing it. The increase in weight over time due to fluid being received in the container over time gives the flow rate as the weight over time indicates the volume of fluid (knowing the mass of the fluid) over time.

As another specific alternative to the ones shown and explained in connection with FIGS. 4-8, the sensor may e.g. be a pressure sensor connected to the needle, e.g. a needle with two fluid passages with one encompassing the other (e.g. a "needle inside a needle") where one passage, e.g. the inner, is for providing most of the fluid while the other, e.g. the outer, is for pressure measurement. It is to be understood that the specific form and/or location of pressure sensor may vary. What is significant is that it can measure the internal pressure within an ingredient capsule received in the beverage preparation machine.

Throughout the present description, the term "top membrane" should be understood as the membrane which is pierced by the fluid injection needle of the machine, as opposed to the "bottom membrane" which should be understood as the membrane located on the opposite side of the capsule. This definition is such that "top" and "bottom" membranes are defined whatever the position of the capsule is within the machine when both capsule and machine are engaged in a functional manner.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

The invention claimed is:

1. A beverage preparation machine comprising:
a reservoir for a fluid;
a brewing head adapted to receive at least one ingredient capsule comprising at least one beverage preparation ingredient;
a pump for pumping a predetermined volume of the fluid from the reservoir to the brewing head, such that the fluid can be injected into the at least one ingredient capsule, when the at least one ingredient capsule is received by the brewing head, to mix with the at least one beverage preparation ingredient under pressure and produce a predetermined volume of beverage,
the reservoir, the pump, and the at least one ingredient capsule in use are in fluidic communication and form a fluid system;
a pressure sensor adapted to measure internal pressure within the at least one ingredient capsule inserted inside the brewing head; and
a locking mechanism adapted to prevent disconnection of the at least one ingredient capsule inserted inside the brewing head from the fluid system if the measured internal pressure exceeds a predetermined threshold pressure value.

2. The beverage preparation machine according to claim 1, wherein the locking mechanism is adapted to prevent access for a consumer to the at least one ingredient capsule inserted inside the brewing head, or to lock the at least one ingredient capsule inserted inside the brewing head in place when the measured internal pressure value exceeds the predetermined threshold pressure value.

3. The beverage preparation machine according to claim 1, wherein the pressure sensor is located in the brewing head.

4. The beverage preparation machine according to claim 1, wherein the pressure sensor is located within the fluid system.

5. The beverage preparation machine according to claim 4, wherein the pressure sensor is located in or in connection to a fluid connection between an inlet of a fluid injection needle and the pump.

6. The beverage preparation machine according to claim 5, wherein the pressure sensor is located near or adjacent to the inlet of the fluid injection needle.

7. The beverages preparation machine according to claim 1, wherein the internal pressure is measured using measurement of a flow of the fluid in the fluid system.

8. The beverage preparation machine according to claim 1, wherein the internal pressure is measured using measurement of a flow of the fluid in the fluid system and a predetermined flow-resistance of the at least one ingredient capsule inserted inside the brewing head.

9. The beverage preparation machine according to claim 1, wherein the predetermined threshold pressure value is a relative pressure of about 0.05 bar to about 0.5 bar.

10. The beverage preparation machine according to claim 1, wherein the beverage preparation machine comprises a capsule holder operable by a consumer to receive the at least one ingredient capsule, and the locking mechanism is adapted to lock the capsule holder when the measured internal pressure exceeds the predetermined threshold pressure value.

11. A beverage preparation machine comprising:
a reservoir for a fluid;
a brewing head adapted to receive at least one ingredient capsule comprising at least one beverage preparation ingredient;
a pump for pumping a predetermined volume of the fluid from the reservoir to the brewing head, such that the fluid can be injected into the at least one ingredient capsule, when the at least one ingredient capsule is received by the brewing head, to mix with the at least one beverage preparation ingredient under pressure and produce a predetermined volume of beverage,
the reservoir, the pump, and the at least one ingredient capsule in use are in fluidic communication and form a fluid system;
a pressure sensor adapted to measure internal pressure within the at least one ingredient capsule inserted inside the brewing head; and
a locking mechanism adapted to prevent disconnection of the at least one ingredient capsule inserted inside the brewing head from the fluid system if the measured internal pressure exceeds a predetermined threshold pressure value,
the brewing head comprises a capsule holder to receive the at least one ingredient capsule, the pressure sensor is embedded in a wall of the capsule holder that is adjacent to a wall of the at least one ingredient capsule when the at least one ingredient capsule is inserted in the capsule holder, and the pressure sensor is adapted to measure pressure being exerted on at least a part of the wall of the capsule holder caused by the internal pressure of the at least one ingredient capsule when received in the capsule holder.

12. The beverage preparation machine according to claim 11, wherein the locking mechanism is adapted to prevent access for a consumer to the inserted at least one ingredient capsule, or to lock the inserted at least one ingredient capsule in place when the measured internal pressure value exceeds the predetermined threshold pressure value.

13. The beverages preparation machine according to claim 11, wherein the internal pressure is measured by the pressure sensor using measurement of a flow of the fluid in the fluid system.

14. The beverage preparation machine according to claim 11, wherein the internal pressure is measured by the pressure sensor using measurement of a flow of the fluid in the fluid system and a predetermined flow-resistance of the at least one ingredient capsule inserted in the brewing head.

15. The beverage preparation machine according to claim 11, wherein the predetermined threshold pressure value is a relative pressure of about 0.05 bar to about 0.5 bar.

16. A beverage preparation machine comprising:
a reservoir for a fluid;
a brewing head adapted to receive at least one ingredient capsule comprising at least one beverage preparation ingredient;
a pump for pumping a predetermined volume of the fluid from the reservoir to the brewing head, such that the fluid can be injected into the at least one ingredient capsule, when the at least one ingredient capsule is received by the brewing head, to mix with the at least one beverage preparation ingredient under pressure and produce a predetermined volume of beverage,
the reservoir, the pump, and the at least one ingredient capsule in use are in fluidic communication and form a fluid system;
a pressure sensor adapted to measure internal pressure within the at least one ingredient capsule inserted inside the brewing head; and
a locking mechanism adapted to prevent disconnection of the at least one ingredient capsule inserted inside the brewing head from the fluid system if the measured internal pressure exceeds a predetermined threshold pressure value,
the pressure sensor comprises a spring or resilient member connected to a fluid injection needle, such that the fluid injection needle is movable along a longitudinal axis of the fluid injection needle, the spring or resilient member is adapted to be compressed in correspondence with movement of the fluid injection needle where the fluid injection needle is moved in dependence of the internal pressure within the at least one ingredient capsule.

17. The beverage preparation machine according to claim 16, wherein the beverage preparation machine comprises a capsule holder operable by a consumer to receive the at least one ingredient capsule, and the locking mechanism is adapted to lock the capsule holder when the measured internal pressure exceeds the predetermined threshold pressure value.

18. A beverage preparation machine comprising:
a reservoir for a fluid;
a brewing head adapted to receive at least one ingredient capsule comprising at least one beverage preparation ingredient;
a pump for pumping a predetermined volume of the fluid from the reservoir to the brewing head, such that the fluid can be injected into the at least one ingredient capsule, when the at least one ingredient capsule is received by the brewing head, to mix with the at least one beverage preparation ingredient under pressure and produce a predetermined volume of beverage,
the reservoir, the pump, and the at least one ingredient capsule in use are in fluidic communication and form a fluid system;
a pressure sensor adapted to measure internal pressure within the at least one ingredient capsule inserted inside the brewing head; and
a locking mechanism adapted to prevent disconnection of the at least one ingredient capsule inserted inside the brewing head from the fluid system if the measured internal pressure exceeds a predetermined threshold pressure value,
the brewing head comprises a surface connected to a fluid injection needle, the surface is adjacent to and connects a top membrane of the at least one ingredient capsule when the at least one ingredient capsule is inserted in the beverage preparation machine, and the pressure sensor is embedded in or connected to the surface and measures pressure exerted upon at least a part of the surface.

19. A beverage preparation machine comprising:
a reservoir for a fluid;
a brewing head adapted to receive at least one ingredient capsule comprising at least one beverage preparation ingredient;
a pump for pumping a predetermined volume of the fluid from the reservoir to the brewing head, such that the fluid can be injected into the at least one ingredient capsule, when the at least one ingredient capsule is received by the brewing head, to mix with the at least one beverage preparation ingredient under pressure and produce a predetermined volume of beverage,
the reservoir, the pump, and the at least one ingredient capsule in use are in fluidic communication and form a fluid system;
a pressure sensor adapted to measure internal pressure within the at least one ingredient capsule inserted inside the brewing head, the internal pressure is measured using measurement of a flow of the fluid in the fluid system;
a locking mechanism adapted to prevent disconnection of the at least one ingredient capsule inserted inside the brewing head from the fluid system if the measured internal pressure exceeds a predetermined threshold pressure value; and
a weight sensor located under a container for receiving the beverage being prepared, the flow of the fluid is measured based on measured change of weight of the container over time.

20. A beverage preparation machine comprising:
a reservoir for a fluid;
a brewing head adapted to receive at least one ingredient capsule comprising at least one beverage preparation ingredient;
a pump for pumping a predetermined volume of the fluid from the reservoir to the brewing head, such that the fluid can be injected into the at least one ingredient capsule, when the at least one ingredient capsule is received by the brewing head, to mix with the at least one beverage preparation ingredient under pressure and produce a predetermined volume of beverage,
the reservoir, the pump, and the at least one ingredient capsule in use are in fluidic communication and form a fluid system;
a pressure sensor adapted to measure internal pressure within the at least one ingredient capsule inserted inside the brewing head;
a locking mechanism adapted to prevent disconnection of the at least one ingredient capsule inserted inside the brewing head from the fluid system if the measured internal pressure exceeds a predetermined threshold pressure value; and a surface connected to a fluid injection needle, the surface is adjacent to and connects a top membrane of the at least one ingredient capsule, and the locking mechanism is adapted to prevent movement of the surface when the measured internal pressure exceeds the predetermined threshold pressure value.

* * * * *